United States Patent [19]

Jaccod

[11] Patent Number: 4,639,238
[45] Date of Patent: Jan. 27, 1987

[54] VARIABLE SPEED DRIVE PULLEY
[75] Inventor: Michel Jaccod, Champigny-sur-Marne, France
[73] Assignee: Valeo, Paris, France
[21] Appl. No.: 802,253
[22] Filed: Nov. 27, 1985
[30] Foreign Application Priority Data Jul. 12, 1984 [FR] France ................................ 8418696

[51] Int. Cl.⁴ ............................................. F16H 55/56
[52] U.S. Cl. .......................................... 474/8; 474/28
[58] Field of Search ..................... 474/8, 28, 43, 44, 16
[56] References Cited

U.S. PATENT DOCUMENTS 3,060,759 10/1962 Brugghen .
3,948,111 4/1976 Dittrich ............................ 474/28 X
4,411,590 10/1983 Meredith ............................ 415/26
4,573,948 3/1986 Thirion de Briel ................... 474/28

FOREIGN PATENT DOCUMENTS 2546257 11/1984 France .
804708 11/1958 United Kingdom .
2109490 6/1983 United Kingdom .
2140106 11/1984 United Kingdom .

Primary Examiner—James A. Leppink
Assistant Examiner—Frank H. McKenzie, Jr.
Attorney, Agent, or Firm—Charles E. Brown; Charles A. Brown

[57] ABSTRACT

A variable speed drive pulley comprises a hub and two annular flange plates around the hub in face-to-face relationship. One of the flange plates is mobile axially relative to the hub. An annular diaphragm of variable cone angle has a peripheral part forming a Belleville spring washer and a central part divided into radial fingers. The Belleville spring washer bears axially on the mobile flange plate through a connection piece and an elastic material annular spacer to which the connection piece is attached. The radial fingers bear on a support piece fixed axially with respect to the hub. A fluid-tight regulating chamber is formed between the mobile flange plate, the diaphragm, the support piece and the hub. It is adapted to be connected to a source of fluid. Sealing means in one piece with the elastic material space are disposed between the connection piece and the mobile flange plate.

10 Claims, 7 Drawing Figures

VARIABLE SPEED DRIVE PULLEY

BACKGROUND OF THE INVENTION

1. Field of the Invention

The present invention is generally concerned with variable speed drives, for example those adapted to be used on an automobile vehicle for driving from the engine thereof any auxiliary component such as an alternator, water pump, compressor or fan.

2. Description of the Prior Art

As is known, each of the two pulleys that a variable speed drive of this kind comprises, one driving and the other driven, comprises a hub and two annular flange plates in face-to-face relationship to one another around said hub adapted to receive a belt, and at least one of these, hereinafter referred to for convenience as the mobile flange plate, is mounted so as to be mobile axially relative to said hub.

In practice, this mobile flange plate can thus move axially between two extreme positions, one advanced and the other retracted, relative to the other flange plate, hereinafter referred to for convenience as the fixed flange plate, it being understood that when the mobile flange plate of the driving pulley is in the advanced position the mobile flange plate of the driven pulley is in the retracted position and vice versa, the corresponding belt occupying in each case a definite position to which corresponds a specific transmission ratio.

The present invention is more particularly directed to the case where, in order to provide continuous control over the overall configuration and thus the transmission ratio, the mobile flange plate of at least one of the pulleys, the driving pulley, for example, is acted on firstly by elastic return means which continously urge it in the axial direction towards the fixed flange plate and which comprise a variable cone angle annular part of diaphragm which, by means of a peripheral part forming a Belleville spring washer, bears axially on the mobile flange plate through the intermediary of an elastic material annular spacer and a connection piece to which the latter is attached, and which, by means of a central part divided into radial fingers, bears on a part, hereinafter referred to for convenience as the support piece, which is axially fixed with respect to the hub, and secondly by a regulating chamber formed in fluid-tight manner between the mobile flange plate, the diaphragm, the support piece and the hub, and adapted to be connected to an appropriate source of fluid, such as a source of pressurized or depressurized pneumatic fluid.

This is the case, for example, in French patent application No 83 08047 filed May 16, 1983.

In this disclosure, in order to seal the regulating chamber in line with the diaphragm the latter is embedded in a mass of elastic material which, in a particularly advantageous manner, is in continuity with the elastic material spacer through the intermediary of which the diaphragm is supported for tilting on the mobile flange plate and with another elastic material spacer on the other side of said diaphragm through the intermediary of which this diaphragm is similarly supported for tilting on the associated support piece.

In a variable speed drive pulley of this type, in order to preserve the integrity of the sealing of the regulating chamber it is preferable to provide sealing means between the mobile flange plate and the connection piece to which is attached the elastic material spacer through the intermediary of which is provided the tilting support of the diaphragm on the mobile flange plate, whilst ensuring positive axial location of said connection piece and said mobile flange plate relative to one another for the purpose of controlled definition of the cone angle of said diaphragm.

A general object of the present invention is an arrangement constituting a particularly simple and satisfactory way of meeting this requirement.

SUMMARY OF THE INVENTION

The present invention consists in a variable speed drive pulley comprising a hub, two annular flange plates around said hub in face-to-face relationship, one of which is mobile axially relative to said hub, an annular diaphragm of variable cone angle having a peripheral part forming a Belleville spring washer and a central part divided into radial fingers, a connection piece, an elastic material annular spacer to which said connection piece is attached and through which said Belleville spring washer bears axially on said mobile flange plate, a support piece fixed axially with respect to said hub on which said radial fingers bear, a fluid-tight regulating chamber formed between said mobile flange plate, said diaphragm, said support piece and said hub and adapted to be connected to a source of fluid, and sealing means in one piece with said elastic material spacer disposed between said connection piece and said mobile flange plate.

In one embodiment said mobile flange plate comprises an axial rim, said connection piece is of right-angled cross-section, having a transverse flange to the back of which is attached said elastic material spacer and an annular axial collar by means of which it is engaged over said axial rim of said mobile flange plate, and said sealing means comprise an elastic material packing at least locally continuous with said elastic material spacer, said variable speed drive pulley further comprising a housing for said sealing means between said axial rim of said mobile flange plate and said connection piece.

As an alternative to this, in a second embodiment said sealing means may comprise an annular lip seal continous with said elastic material spacer, the material constituting said lip seal and said spacer extending around the edge of said transverse flange of said connection piece, said lip seal being applied elastically against said axial rim of said mobile flange.

As a further alternative, this annular lip seal may be replaced by a simple skin.

In all cases a single operation is advantageously sufficient to produce at the same time both the elastic material spacer and the sealing means between the corresponding connection piece and the mobile flange.

The characteristics and advantages of the invention will emerge from the following description given by way of example with reference to the accompanying schematic drawings.

DESCRIPTION OF THE PREFERRED EMBODIMENTS

Figure 1:
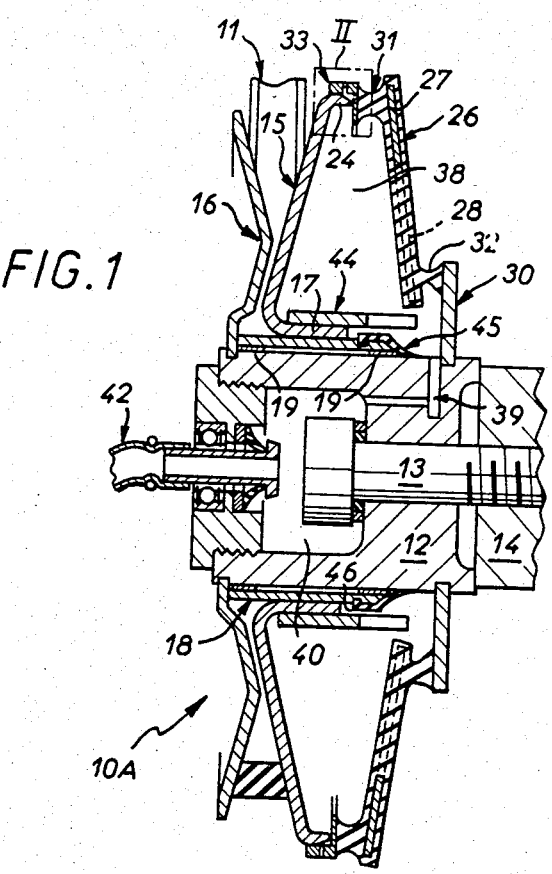
FIG. 1 is a view in axial cross-section of a variable speed drive pulley in accordance with the invention.

FIG. 1 shows a variable speed drive pulley adapted for use in a variable speed drive of the type described in the aforementioned French patent application No 83 08047.

In practice it is the driving pulley 10A of the latter.

This driving pulley 10A comprises a hub 12 which, for example, and as illustrated, is attached by means of a screw 13 at the end of a drive shaft 14, thus being fixed in terms of rotation to the latter, and, opposite one another, round said hub 12, two annular flange plates 15, 16 with frustoconical flanks adapted to receive a belt 11, at least one of which, in practice the flange plate 15, referred to hereinafter for convenience as the mobile flange plate, is mounted so as to be axially movable relative to the hub 12.

In practice, only the flange plate 15 is movable in this way relative to the hub 12, the associated flange plate 16, hereinafter referred to for convenience as the fixed flange plate, being fastened to the hub axially and rotationally, being for example and as illustrated crimped to the end thereof at its inside periphery.

In order to be movable on the hub 12, the mobile flange plate 15 is fastened axially to a sleeve 18 which slides on the hub 12.

In practice, in the embodiment shown, the mobile flange plate 15 features for this purpose in its central area an axial collar 17 extending in the direction away from the fixed flange plate 16 and by means of which it is attached, as by a simple force fit or as by welding, for example, to said sleeve 18, and two anti-friction material pads 19 are disposed at respective ends of this sleeve 18 between it and the hub 12.

In practice, the mobile flange plate 15 is in one piece with its axial collar 17 and with an axial rim 24 at its periphery facing the same way as the axial collar 17.

The resulting mobiel flange plate 15 is continuously urged towards the fixed flange plate 16 by axially acting elastic return means. In the embodiment shown, these comprise an annular member or diaphragm 26 of variable cone angle which, through a peripheral part 27 forming a Belleville spring washer, is supported axially for tilting against the mobile flange plate 15, more specifically against the edge of the axial rim 24 of the latter, and which through a central part 28 divided into radial fingers is supported axially for tilting against a member 30, referred to hereinafter for convenience as the support piece, axially fixed with respect to the hub 12, as by crimping for example and as illustrated.

In the embodiment shown, the suppport piece 30 is thus fixed with respect to the hub 12 not only axially but also circumferentially.

The tilting axial supports of the diaphragm 26 on the mobile flange plate 15 and on the support piece 30 each make use of an elastic material spacer, 31 and 32 respectively, which are in one piece with a mass of elastic material in which the diaphragm 26 is entirely embedded.

In practice, the annular spacer 31 is attached to a connection piece 33, of metal, for example, by means of which the combination is attached at least axially, and in practice both axially and circumferentially, to the axial rim 24 of the mobile flange plate 15, and the annular spacer 32 is likewise attached to the support piece 30.

A regulating chamber 38 is thus formed between the mobile flange plate 15, the hub 12 and the assembly consisting of the annular piece 26, its elastic material coating, the annular spacers 31 and 32 and the support piece 30.

This regulating chamber 38 is adapted to be connected to a source of fluid, and in particular to a source of pneumatic fluid which is pressurized or depressurized.

To this end it communicates by means of a passage 39 with a chamber 40 inside the hub 12 which is itself adapted to be connected in fluid-tight manner by a nozzle 42 to the source of fluid concerned.

These arrangements are well known in themselves, in particular through French patent application No. 83 08047, and therefore will not be described in more detail here.

In a manner which is also known in itself, abutment means are associated with the mobile flange plate 15 to define its advanced and retracted extreme positions; for one axial direction these means consist in the sleeve 18 to which it is axially fastened and for the opposite axial direction these means consist in an annular spacer 44, referred to hereinafter for convenience as the abutment spacer, axially fastened to the mobile flange plate 15, being attached to its axial collar 17, and adapted to limit axial displacement in said opposite direction.

In practice, being of sufficient length for the purpose, the sleeve 18 is adapted to cooperate abutment fashion with the fixed flange plate 16 whereas the abutment spacer 44 is adapted to cooperate abutment fashion with the support piece 30.

To achieve more reliable sealing of the regulating chamber 38 sealing means are provided around the hub 12, at the inside periphery of the mobile flange plate 15, and between the connection piece 33 and said mobile flange plate 15, at the outside periphery of the latter.

In the manner known in itself, the sealing means thus provided around the hub 12 comprise, in the embodiment shown, a seal 45 which is in practice a lip seal clamped elastically against said hub 12 beneath the abutment spacer 44 and coupled to the mobile flange plate 15 so as to move therewith, being for this purpose anchored in a groove 46 in the sleeve 18 to which the mobile flange plate 15 is fixed axially.

In accordance with the invention, the sealing means provided between the connection piece 33 and the mobile flange plate 15 are in one piece with the corresponding elastic material spacer 31.

In practice, and in the manner known in itself, the connection piece 33 is of right-angled profile in axial cross-section.

It features a transverse flange 48, to the back of which is attached the elastic material spacer 31, and an annular axial collar 49 by means of which it is engaged with the axial rim 24 at the outside periphery of the mobile flange plate 15, as by force fitting, for example, or possibly by spot welding or riveting.

Figure 2:
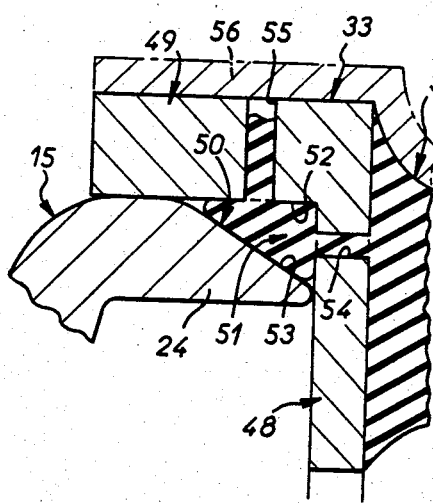
FIG. 2 shows to a larger scale the detail of FIG. 1 indicated by a box II thereon.
Figure 3:
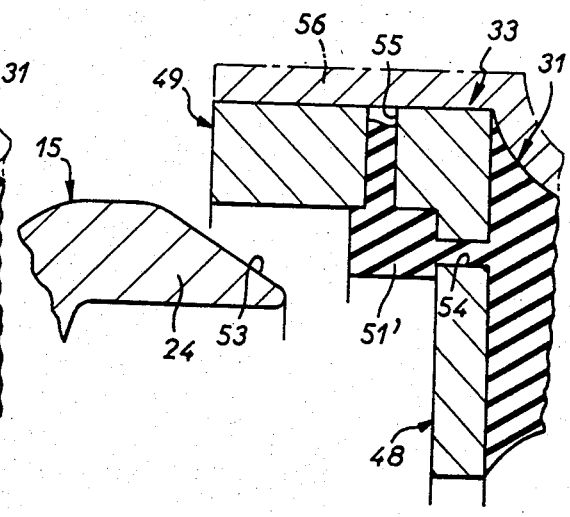
FIG. 3 is a view analogous to that of FIG. 2 showing how the variable speed drive pulley in accordance with the invention is assembled.

In the embodiment specifically shown in FIGS. 1 through 3, the associated sealing means are accommodated in a housing 50 provided for them between the axial rim 24 of the mobile flange plate 15 and the connection piece 33, and they comprise an elastic material packing 51 which is continuous with the elastic material spacer 31 at least.

In practice, in this embodiment the housing 50 is delimited by the inside corner 52 of the connection piece 33 and by a bevel 53 at the edge of the outside surface of the axial rim 24 of the mobile flange plate 15, and the continuity between the elastic material packing 51 in this housing 50 and the elastic material spacer 31 results from the presence of at least one passage 54 in the transverse flange 48 of said connection piece 33 in line with said housing 50.

Preferably, and as illustrated, the axial collar 49 of the connection piece 33 also features, in line with the housing 50, at least one passage 55 which forms a vent and which, as shown in full line, is filled with the elastic material to a greater or lesser extent.

In the variant embodiment schematically shown in chain-dotted lines in FIGS. 2 and 3 the elastic material spacer 31 is continuous with a skin 56 which covers the outside surface of the axial collar 49 of the connection piece 33 and which is itself continuous with the elastic material packing 31 by virtue of the passage or passages 55 provided in the connection piece 33.

Be this as it may, the edge of the axial rim 24 of the mobile flange plate 15 is in axial contact with the transverse flange 48 of the connection piece 33.

As will be readily understood, when the elastic material spacer 31 is formed the material constituting it passes through the passage or passages 54 in the transverse flange 48 of the connection piece 43 until it discharges through the passage or passages 55 in the axial collar 49 of the latter which form(s) vents or until it completely fills this passage or these passages 55 where a skin 56 is provided on the surface of the axial collar 49, forming a ring 51' (FIG. 3) in the inside corner formed between said flange 48 and said collar 49.

In the embodiment shown this ring 51' has a rectangular axial cross-section.

This is not necessarily always the case, however.

Be this as it may, when the connection piece 33 is engaged over the outside surface of the axial rim 24 of the mobile flange plate 15 it is compressed, so producing the required elastic material packing 51.

On such engagement, the ring 51' comes into contact with the axial rim 24 of the mobile flange 15 via the bevel 53 on the latter and is progressively caused to flow by this in the direction towards the flange 48 and collar 49 of the connection piece 33.

By virtue of the wedging effect thus obtained, there is advantageously no need to machine precisely the bevel 53.

In practice, engagement of the connection piece 33 over the axial rim 24 of the mobile flange plate 15 continues until its transverse flange 48 contacts the edge of the axial rim 24, procuring positive axial location between the connection piece 33 and the mobile flange plate 15.

The housing 50 then delimited between the connection piece 33 and the bevel 53 on the axial rim 24 is naturally made sufficient to provide for such flow of the ring 51'.

When it is achieved by force, the sleeving of the connection piece 33 over the axial rim 24 of the mobile flange plate 15 is sufficient to provide the necessary coupling between the connection piece 33 and the mobile flange plate 15.

As an alternative to or in addition to this, however, as indicated hereinabove, this coupling may also be achieved by welding or by riveting.

Figure 4:
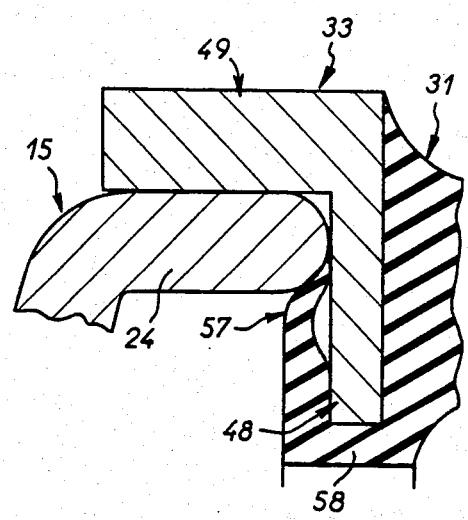
FIGS. 4 and 5 are views respectively analogous to those of FIGS. 2 and 3 concerning an alternative embodiment.
Figure 5:
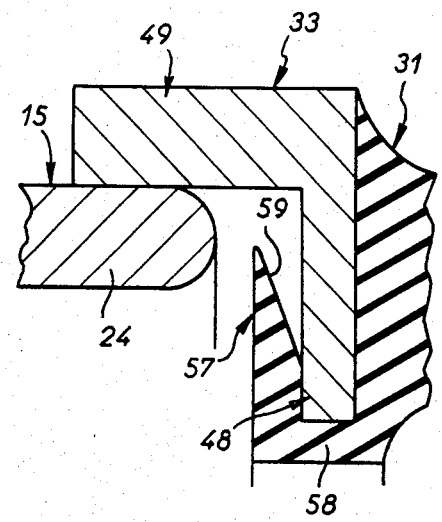

In the alternative embodiment shown in FIGS. 4 and 5 the sealing means between the connection piece 33 and the mobile flange plate 15 comprise an annular lip seal 57 continuous with the elastic material spacer 31, applied elastically against the axial rim 24 on said mobile flange plate 15, a section 58 of the material constituting the annular lip seal 57 and the elastic material spacer 31 of U-shaped transverse cross-section extending around the edge of the transverse flange 48 of said connection piece 33.

In practice this annular lip seal 57 is stressed axially, being elastically deformed in the direction towards the transverse flange 48 of the connection piece 33 by the axial rim 24 of the mobile flange plate 15.

As shown in FIG. 5, before fitting the connection piece 33 over the mobile flange plate 15, the lip seal 57 extends substantially straight, parallel to the transverse flange 48 of said connection piece 33 with a bevel 59 on its side facing the transverse flange 48 giving it an axially tapered profile and, its end being located on a circumference the diameter of which is intermediate those of the inside and outside surfaces of the axial rim 24, it interferes with the latter when the connection piece 33 is engaged over it, which leads to it being deformed in the direction towards the transverse flange 48 of said connection piece 33, to bear elastically on said axial rim 24.

Figure 6:
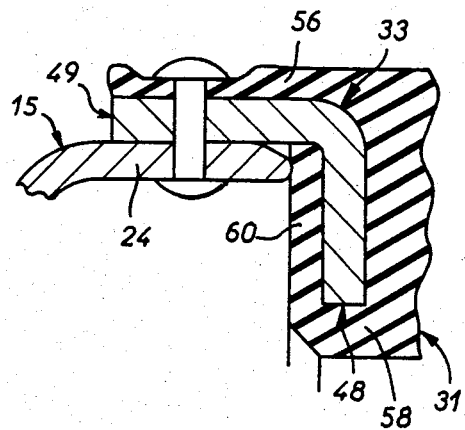
FIGS. 6 and 7 are views which, analogous to the foregoing and in like manner thereto, relate to a further embodiment.
Figure 7:
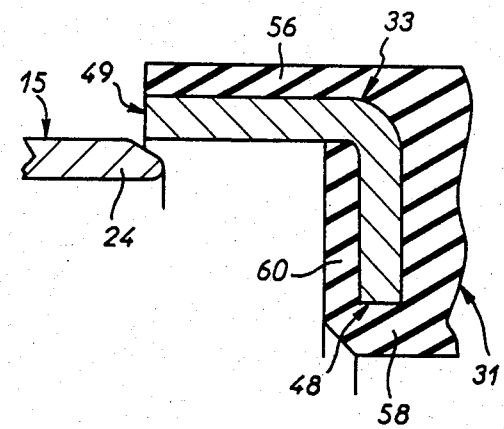

In the embodiment shown in FIGS. 6 and 7, the previous annular lip seal 57 is replaced by a simple skin 60 which, like the lip seal, is continuous with the elastic material spacer 31 by virtue of a section 58 of U-shaped transverse cross-section and which forms an annular covering over at least part of the inside surface of the transverse flange 48 of the connection piece 33.

In the embodiment shown this skin 60 extends over all of the transverse flange 48 of the connection piece 33 up to the axial collar 49 thereof.

At the time of assembly, the connection piece 33 is sufficiently engaged over the axial rim 24 of the mobile flange plate 15 for the axial rim 24 to have, vis-à-vis the skin 60 covering the transverse flange 48 of the connection piece 33, a "penetration" travel from which results local elastic crushing of said skin 60.

This skin 60 being in this way locally stressed in the axial direction, being elastically deformed in the direction towards the transverse flange 48 of the connection piece 33 by the axial rim 24 of the mobile flange plate 15, a good seal is obtained, in spite of any defects with regard to the flatness of said skin 60.

To avoid damaging the skin 60 the edge of the axial rim 24 of the mobile flange plate 15 is preferably of convex shape, as shown.

As the axial position of the connection piece 33 relative to the mobile flange plate 15 depends on the crushing of the skin 60 covering the transverse flange of the connection piece 33, all that is required to control it is to apply a specific constant axial force during the corresponding engagement.

Finally, in this embodiment, on completion of such engagement the connection piece 33 is riveted to the axial rim 24 of the mobile flange plate 15, as shown in FIG. 6, so as to positively define its axial position relative thereto.

In the embodiment shown this riveting is done through a skin 56 of elastic material continuous with the elastic material spacer 31.

In all cases the regulating chamber 30 is efficaciously sealed.

With the resulting driving pulley 12A there is conjugately associated a driven pulley with the belt 11 passing in a loop around both the driving and driven pulleys.

The driven pulley may be of the same type of construction as that described hereinabove in relation to the driving pulley 10A, with or without regulating chamber.

Thus is will not be described in more detail here.

It will be understood that various changes in the details, materials and arrangements of parts which have been herein described and illustrated in order to explain the nature of the invention may be made by those skilled in the art within the principle and scope of the invention as expressed in the appended claims.

I claim:

1. Variable speed drive pulley comprising a hub, two annular flange plates around said hub in face-to-face relationship, one of which is mobile axially relative to said hub, an annular diaphragm of variable cone angle having a peripheral part forming a Belleville spring washer and a central part divided into radial fingers, a connection piece, an elastic material annular spacer to which said connection piece is attached and through which said Belleville spring washer bears axially on said mobile flange plate, a support piece fixed axially with respect to said hub on which said radial fingers bear, a fluid-tight regulating chamber formed between said mobile flange plate, said diaphragm, said support piece and said hub and adapted to be connected to a source of fluid, and sealing means in one piece with said elastic material spacer disposed between said connection piece and said mobile flange plate.

2. Pulley according to claim 1, wherein said mobile flange plate comprises an axial rim, said connection piece is of right-angled cross-section, having a transverse flange to the back of which is attached said elastic material spacer and an annular axial collar by means of which it is engaged over said axial rim of said mobile flange plate and said sealing means comprise an elastic material packing at least locally continuous with said elastic material spacer, said variable speed drive pulley further comprising a housing for said sealing means between said axial rim of said mobile flange plate and said connection piece.

3. Pulley according to claim 2, wherein said axial rim of said mobile flange plate has a bevel on its outside surface and said housing is delimited by an inside corner of said connection piece and said bevel.

4. Pulley according to claim 2, further comprising at least one passage through said connection piece in line with said housing and through which said elastic material packing is continuous with said elastic material spacer.

5. Pulley according to claim 4, wherein said transverse flange of said connection piece features at least one passage in line with said housing.

6. Pulley according to claim 4, wherein said axial collar of said connection piece features at least one passage in line with said housing.

7. Pulley according to claim 1, wherein said mobile flange plate comprises an axial rim, said connection piece is of right-angled cross-section, having a transverse flange to the back of which is attached said elastic material spacer and an annular axial collar by means of which it is engaged over said axial rim of said mobile flange plate, and said flange means comprise an annular lip seal continuous with said elastic material spacer, the material constituting said lip seal and said spacer extending around the edge of said transverse flange of said connection piece and said lip seal being applied elastically against said axial rim of said mobile flange plate.

8. Pulley according to claim 7, wherein said lip seal is axially stressed, being deformed in the direction towards said transverse flange of said connection piece by said axial rim of said mobile flange plate.

9. Pulley according to claim 2, wherein the edge of said axial rim of said mobile flange plate is in axial contact with said transverse flange of said connection piece.

10. Pulley according to claim 1, wherein said mobile flange plate comprises an axial rim, said connection piece is of right-angled cross-section, having a transverse flange to the back of which is attached said elastic material spacer and an annular axial collar by means of which it is engaged over said axial rim of said mobile flange plate, and said sealing means comprise a skin continous with said elastic material spacer, the material constituting said skin and said spacer extending around the edge of said transverse flange of said connection piece and said skin forming an annular covering over at least part of the inside surface of said transverse flange of said connection piece and being at least locally stressed axially, being deformed in the direction towards said transverse flange of said connection piece by said axial rim of said mobile flange plate.

* * * * *